United States Patent [19]

Reuter

[11] Patent Number: 5,328,149

[45] Date of Patent: Jul. 12, 1994

[54] APPARATUS FOR OPERATING A VALVE ELEMENT

[75] Inventor: Martin Reuter, Dachau, Fed. Rep. of Germany

[73] Assignee: Marco Systemanalyse und Entwicklung GmbH, Dachau, Fed. Rep. of Germany

[21] Appl. No.: 79,446

[22] Filed: Jun. 18, 1993

[30] Foreign Application Priority Data

Jun. 19, 1992 [DE] Fed. Rep. of Germany ....... 4220177

[51] Int. Cl.⁵ ................................. F16K 11/02
[52] U.S. Cl. ...................... 251/129.06; 251/129.2
[58] Field of Search .......... 251/129.06, 129.09, 251/129.2

[56] References Cited

U.S. PATENT DOCUMENTS 4,787,071 11/1988 Kreuter et al. ............ 251/129.06 X
5,040,567 8/1991 Nestler et al. ................ 251/129.2 X
5,076,314 12/1991 Ikehata et al. ............. 251/129.06 X
5,094,429 3/1992 Dostert ....................... 251/129.06

FOREIGN PATENT DOCUMENTS 61-74901 4/1986 Japan ............................. 251/129.06

Primary Examiner—Stephen M. Hepperle

[57] ABSTRACT

In an apparatus for operating a valve element consisting of a base, an operating lever pivotally journalled with respect to the base and a drive apparatus which is secured to the base and engages the operating lever which has at least one of its ends for operating on the valve element, the drive apparatus comprises two piezo-electric transistors which are secured with a nonparallel orientation between the base and the operating lever such that they are each moveable relative to the base and the operating lever about an axis parallel to the pivoting or rocking axis of the operating lever.

7 Claims, 1 Drawing Sheet

APPARATUS FOR OPERATING A VALVE ELEMENT

BACKGROUND OF THE INVENTION

The present invention relates to an apparatus for operating a valve element according to the preamble of claim 1.

Generally, electromagnetics are employed for operating hydraulic multi-port valves. With these, coil currents of a few hundred milliamperes are necessary at a supply voltage of, for example, 12 volts to produce the necessary driving force of typically 100 Newtons.

With the addition of an environment posing an explosive danger (for example the individual current circuits in an underground coal mine) it is however very desirable to keep the necessary electrical power as small as possible for safety. As a rule, there are approximately eight functions to control at an installation in a coal project according to each design. Since individual networks are not available for any desired power, a network must be installed to serve approximately five installations. Under such circumstances, it is already contemplated that not all of the valves will be controlled at once.

SUMMARY OF THE INVENTION

It would be ideal if such a low current consumption could be totally consumed in the network and in the 220 volt power lines within the project.

Electromagnetically operated valves have a basic disadvantage in that to maintain an active switching condition a fixed coil current is necessary. The present invention has as an object an apparatus of the aforementioned type in which only a very small electrical power is required for its operation.

This object is achieved means of the features described in the characterizing portion of claim 1.

Piezo-electric transistors are known. They actually consist of a stack of piezo-electric elements which are manufactured from a ferro-electric ceramic material. A typical thickness change or displacement of a disk of piezo-electric ceramic amounts only $1 \times 10^{-3}$ mm with an associated field strength of 1000 V/mm (if the expansion does not reduce the stress); however, a displacement of the stack, that is of the transistors, corresponding to a specified performance figure can be achieved by stacking a corresponding number of piezo-electric disks on top of one another.

With the application of the control voltage to a piezo-electric transistor one needs to know only the load current to be consumed by the capacitance of the displacement element. Beyond that there is only a negligible residual current. Piezo-electric transistors distinguish themselves through freedom from abrasion, fast switching times and high displacement forces at the beginning of the switching process. It is precisely this last feature which makes them especially suitable for operating hydraulic valves because the required force at the poppet of the hydraulic valve at the beginning of the displacement process is largest, while the hydraulic resistive forces correspondingly decrease quickly. This requirement corresponds with the force/displacement characteristics of the piezo-electric transistors, while on the other hand, in a drive mechanism having an electromagnetic at constant coil current the output of force increases with displacement.

In spite of these obvious advantages, piezo-electric transistors first became practically significant as substitutes for the operation of valves through the solution of the present invention.

As an example, one type of transistor manufactured by the firm Hoechst-CeramTec has a height of 16 mm and achieves an expansion displacement of 20 $\mu$m at a voltage of 400 volts. Constrained it exerts an expansion force of 1500 N. From this data it follows that for a required displacement of 200 $\mu$m a leverage of 1:10 is needed.

The thermal expansion coefficient of piezo-ceramics is smaller than that of steel ($13 \times 10^{-6}$) by approximately a factor of 2. With a temperature variation of 30° this means a difference in the thermal change of length of more than 3 $\mu$m per 16 mm. This is already a significant portion of the total displacement of 20 $\lambda$m which can be produced with the transistor.

The solution according to the present invention now eliminates this problem in that the counteracting effect of two transistors can be fully utilized for pivoting or rocking the operating lever. Non-electric expansion effects, which for example are based upon temperature variations and which consequently occur similarly in both stacks, can therefore be fully compensated for. Consequently, the full displacement of the transistors can be used.

Advantageous examples of the invention are described in the dependant claims.

Additional features and advantages of the invention are given in the following description which in combination with the accompanying drawings further describe the invention with the aid of exemplatory embodiments.

DESCRIPTION OF THE PREFERRED EMBODIMENTS

Figure 1:
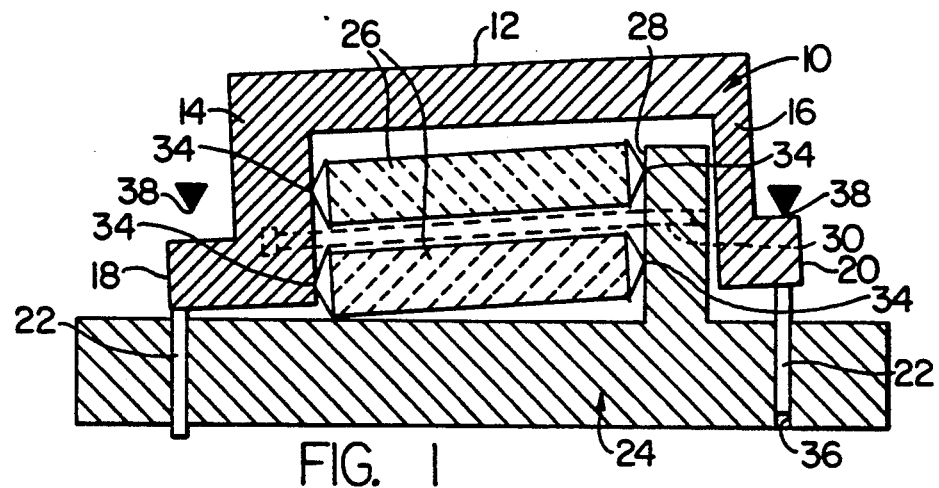
FIG. 1 is a functional schematic of an operating device in accordance with the present invention at a cross section extending through the transistor axis.

In FIG. 1 a rocker arm or operating lever is designated 10 and has an essentially C-shaped configuration. It is comprised of one means or a longitudinal leg 12 as well as two transverse legs 14 and 16 perpendicular to the leg 12. These legs carry at their free ends outwardly extending operating sections 18 and 20, each of which is arranged adjacent an operating tappet 22.

The operating lever 10 is pivotally or rockably journalled to a base 24. The pivoting and the rocking of the operating lever 10 is produced with the help of two piezo-electric transistors 26, called a stack, built up from individual piezo-electric elements which are constrained between the transverse leg 14 and one of the essentially parallel constraining surfaces 28 of the base 24, with the stack axes parallel to one another however with their effective orientation nonparallel. A restraining force is produced by two draw screws or restraining bolts 30 running between the two transistors, which bolts at the one side engage the transverse leg 14 and at the other side the constraining surface 28 consisting of a continuation of the base 24. The transistors 26 are so constrained between the transverse leg 14 and the constraining surface 28 that they are each pivotable by a limited amount relative to the constraining surfaces about axes 34 extending perpendicular to the plane of the drawings through the apexes of the triangles at the corners of the transistors. The tappets 22 are slidably guided in bores 36 of the base 24.

In the rest condition the elastic forces resulting from the compression of the piezo-electric stacks 26 counteract the forces of the two extension bolts 30 and hold them in balance. The operating lever 10 is so adjusted that no rocking takes place. Valve tappet springs (not illustrated) which work on the operating tappets 22 serve to hold the operating lever 10 at both sides against the abutments indicated by the solid black triangles 38.

A counteracting excitation of the two transistors causes a shifting of the effective line of the forces exerted by the stack and with this a rocking movement or torque for the operating lever 10. The abutments 38 ensure that the rocking movements are only effective in the downward direction, that is in the direction of the valve tappets. The arrangement, however is effective symmetrically in both directions so that the tappets 22 can operate two hydraulic valve tappets either way.

Indeed since the expansion of the one transistor as well as the contraction of the other transistor brings into play the production of the referenced rocking motion, with relatively minimal expense the required displacement and the necessary force for lifting the valve element can be brought about.

Figure 2:
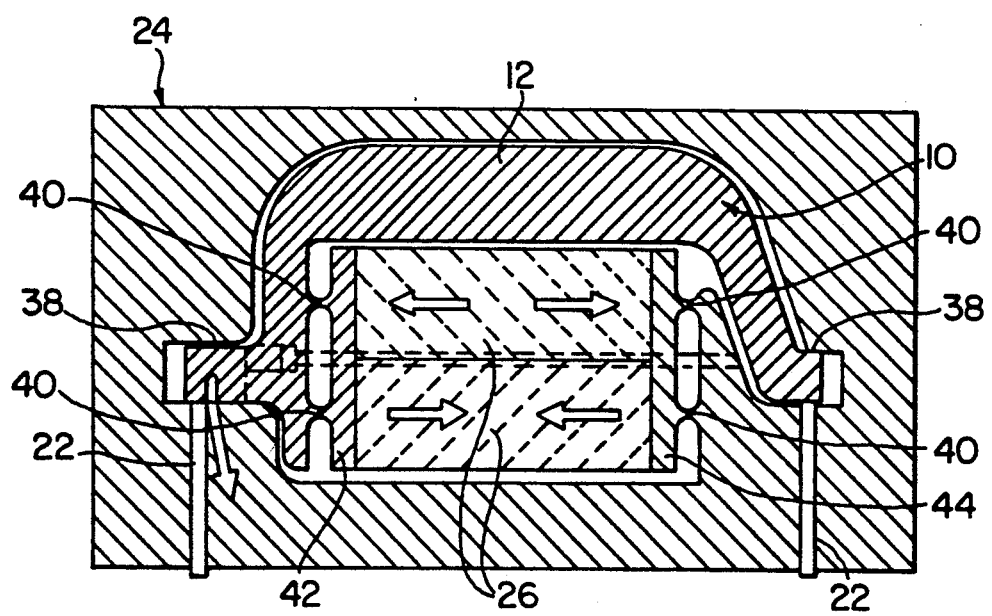
FIG. 2 is a schematic cross section corresponding to FIG. 1 through a realistic embodiment of an operating device in accordance with the present invention.

In the realistic embodiment illustrated in FIG. 2 the same parts are provided with the same reference numerals. The linkage containing the axis 34 is realized through thin material bridges 40 by which the backing elements 42, 44 are connected with the transverse leg of 14 and correspondingly the base 24. The practical embodiment illustrated is extraordinarily compact and practically wear-free since it has no linkage elements that can wear out.

I claim:

1. An apparatus for operating a valve element comprised of a base, a pivotally journalled operating lever opposite the base and a drive device which is secured to the base and engages the operating lever, at least one of the ends of the operating lever having an effect on the valve element, characterized in that the drive device includes two piezo-electric transistors which are constrained with a nonparallel orientation between the base and the operating lever such that they are moveable relative to the base and the operating lever about an axis parallel to the pivoting or rocking axis of the operating lever.

2. An apparatus according to claim 1, characterized in that the transistors each are constrained between a first constraining element secured to the base and second constraining element secured to the lever whereby the constraining elements are connected with the respective portions (lever and body) by means of a linkage.

3. An apparatus according to claim 2, characterized in that each linkage is formed from a thin material bridge.

4. An apparatus according to the claim 1, characterized in that transistors engage the operating lever at a mid region between the longitudinal ends of the same and each longitudinal end of the operating lever is connected with a valve operating element.

5. An apparatus according to claim 4, characterized in that the operating lever and the drive device are arranged in a recess of the base such that the operating lever in the region of each of its ends lies in its rest position close to an abutment secured to the base.

6. An apparatus according to claim 1, characterized in that the operating lever is formed with a C-shape, with a longitudinal link in its mid-portion and two transverse legs extending substantially perpendicular to the link (12), the transverse legs at each of the free ends having an operating section (18,20) projecting outwardly parallel to the longitudinal link (12) and the two transistors (26,26) being oriented with their operating orientation parallel to the longitudinal link (12) and constrained between a constraining surface of the lever located on a transverse leg (14) and a parallel constraining surface (44) secured to the base and located close to the other transverse leg (16).

7. An apparatus according to claims 5, characterized in that transistors are held by means of two tension bolts extending between them and intersecting the constraining surfaces.

* * * * *

UNITED STATES PATENT AND TRADEMARK OFFICE
CERTIFICATE OF CORRECTION

PATENT NO. : 5,328,149
DATED : July 12, 1994
INVENTOR(S) : Martin Reuter

It is certified that error appears in the above-identified patent and that said Letters Patent is hereby corrected as shown below:

Column 4, lines 31-39, in claim 6,

Lines 5-13.  delete all reference numerals in this claim;

Signed and Sealed this

Twenty-fifth Day of April, 1995

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,328,149
DATED : July 12, 1994
INVENTOR(S) : Martin Reuter

Page 1 of 4

It is certified that error appears in the above-indentified patent and that said Letters Patent is hereby corrected as shown below:

Cover Page:

In the Abstract:

Please delete "transistors which are secured with a nonparallel orientation" and insert --translators which operate in parallel but opposite directions from one another--.

Column 1:

Line 40, please delete "transistors" and insert --translators--;
Line 47, please delete "transistors" and insert --translators--;
Line 52, please delete "transistors" and insert --translators--;
Line 55, please delete "transistors" and insert --translators--;
Line 65, please delete "transistors" and insert --translators--.

UNITED STATES PATENT AND TRADEMARK OFFICE
CERTIFICATE OF CORRECTION

PATENT NO. : 5,328,149
DATED : July 13, 1994
INVENTOR(S) : Martin Reuter

It is certified that error appears in the above-indentified patent and that said Letters Patent is hereby corrected as shown below:

Column 2:

Line 2, please delete "transistors" and insert --translators--;
Line 5, please delete "transistor" and insert --translator--;
Line 18, please delete "transistor" and insert --translator--;
Line 21, please delete "transistors" and insert --translators--;
Line 26, please delete "transistors" and insert --translators--;
Line 39, please delete "transistor" and insert --translator--;
Line 56, please delete "transistors" and insert --translators--;
Line 61, please delete "orientation nonparallel" and insert -- directions o operation opposite one another --.

UNITED STATES PATENT AND TRADEMARK OFFICE
CERTIFICATE OF CORRECTION

PATENT NO. : 5,328,149

DATED : July 13, 1994

INVENTOR(S) : Martin Reuter

It is certified that error appears in the above-indentified patent and that said Letters Patent is hereby corrected as shown below:

Column 2:

Line 63, please delete "transistors" and insert --translators--;

Line 66, please delete "transistors" and insert --translators--.

Column 3:

Line 4, please delete "transistors" and insert --translators--;

Line 14, please delete "transistors" and insert --translators--;

Line 23, please delete "transistor" and insert --translator--;

Line 24, please delete "transistor" and insert --translator--;

Line 40, please delete "a pivotally journaled" and insert --an--;

Line 41, please delete "opposite" and insert --pivotally journaled relative to--.

UNITED STATES PATENT AND TRADEMARK OFFICE
CERTIFICATE OF CORRECTION

PATENT NO. : 5,328,149
DATED : July 13, 1994
INVENTOR(S) : Martin Reuter

It is certified that error appears in the above-indentified patent and that said Letters Patent is hereby corrected as shown below:

Column 4:

Line 1, please delete "transistors" and insert --translators--;

Line 2, please delete "with a nonparallel orientation" and insert --to move in parallel but opposite directions--;

Line 8, please delete "transistors" and insert --translators--;

Line 18, please delete "transistors" and insert --translators--;

Line 34, please delete "transistors" and insert --translators--;

Line 41, please delete "transistors" and insert --translators--.

Signed and Sealed this

Fourteenth Day of October, 1997

*Attest:*

BRUCE LEHMAN

*Attesting Officer*  *Commissioner of Patents and Trademarks*